(12) United States Patent
Uchiyama et al.

(10) Patent No.: US 6,603,305 B2
(45) Date of Patent: Aug. 5, 2003

(54) ROTARY ENCODER HAVING CODE MEMBER ROTATING ALONG ACCURATE CIRCLE AS SHAFT ROTATES

(75) Inventors: Hideki Uchiyama, Miyagi-ken (JP); Toshio Ogawa, Miyagi-ken (JP); Hirofumi Okumura, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/029,383

(22) Filed: Dec. 21, 2001

(65) Prior Publication Data

US 2002/0089300 A1 Jul. 11, 2002

(30) Foreign Application Priority Data

Dec. 27, 2000 (JP) ........................................ 2000-401371

(51) Int. Cl.$^7$ .............................. G01B 7/14; G01R 33/07
(52) U.S. Cl. .................................. 324/207.25; 324/207.2
(58) Field of Search ........................ 324/207.22, 207.25, 324/174, 207.21, 207.2, 160, 173; 384/448

(56) References Cited

U.S. PATENT DOCUMENTS

| | | | |
|---|---|---|---|
| 4,940,936 A | * 7/1990 | Grillo et al. | ................. 324/174 |
| 5,271,269 A | * 12/1993 | Rilling et al. | ............... 73/118.1 |
| 5,491,632 A | 2/1996 | Pawlak et al. | |
| 5,787,375 A | 7/1998 | Madau et al. | |

FOREIGN PATENT DOCUMENTS

| | | |
|---|---|---|
| EP | 1014040 | 6/2000 |
| JP | 11-241918 | 9/1999 |

OTHER PUBLICATIONS

Tochtermann/Bodenstein, "Konstruktionselemente des Maschinenbaus," 1968, Springer, Berlin — Heidelberg, New York, XP1002214113, pp. 96–97.

* cited by examiner

*Primary Examiner*—Reena Aurora
(74) *Attorney, Agent, or Firm*—Beyer Weaver & Thomas, LLP

(57) ABSTRACT

An object of the present invention is to provide a rotary encoder that has a code member which rotates so as to draw an accurate circle as a shaft rotates. Such rotary encoder includes a casing; a detection element attached to the casing; and a rotatable rotor having a mounting aperture for inserting a shaft at the center thereof and being provided with a code member opposing to the detection element, in which an inner peripheral surface of the mounting aperture is provided with a spring member having a base and a plurality of tongues for energizing the shaft toward the center of the mounting aperture so as to set a position of the shaft at the center of the mounting aperture.

3 Claims, 4 Drawing Sheets

ROTARY ENCODER HAVING CODE MEMBER ROTATING ALONG ACCURATE CIRCLE AS SHAFT ROTATES

BACKGROUND OF THE INVENTION

1. Field of Invention

The present invention relates to a rotary encoder used for detecting a rotating angle of a steering in a power steering system and the like of a vehicle, and in particular, relates to a mounting structure of a rotor placed therewithin.

2. Description of the Prior Art

A conventional rotary encoder R1 will be described with reference to drawings. FIG. 9 is a cross-sectional view of main parts of the conventional rotary encoder, FIG. 10 is a plan view of a speed nut thereof, and FIG. 11 is an enlarged cross-sectional view of main parts of the conventional rotary encoder.

Now, referring to FIGS. 9 to 11, a structure of the conventional rotary encoder will be described. To a main body 100 to which the rotary encoder R1 is to be attached, a cylinder 102 is formed in such a manner that the cylinder 102 projects from a part of a wall 101 in a bottomed cylindrical shape. In the cylinder 102, a bearing 103 composed of a ball bearing having a plurality of balls is disposed.

In the center of a sidewall of the cylinder 102, a through hole 104 in a circular shape is formed.

The rotary encoder R1 includes a casing 110 composed of a double-stack tube portion, a shaft 120, a code plate 130 as a code member rotating together with the shaft 120, a hall element 113 disposed opposite to the code plate 130, and a speed nut 140 for holding the code plate 130 so as not to fall off from the shaft 120.

The casing 110 is formed so that the cross section thereof has a generally T-letter shape, and an opening 111 is formed on the sidewall thereof (on an upper side of FIG. 9). On an opening side of the cylinder is fixed to the main body 100 by an appropriate means such as soldering. A printed circuit board 112 of a rectangular flat plate is attached to the opening 111 so as to project outward. To the printed circuit board 112, the hall element 113 is attached while being connected to a detection circuit (not shown) or the like, and the hall element 113 is placed at the opening 111.

The shaft 120 includes a first shaft 121 having a larger diameter, and a second shaft 122 having a smaller diameter formed in such a manner that it projects from an end of the first shaft 121. The first shaft 121 is rotatably held by the bearing 103 through a through hole 104 of the cylinder 102, and the second shaft 122 is located inside the casing 110 while projecting from the cylinder 102.

The code plate 130 is formed of a permanent magnet in a disk shape, and a through hole 131 is formed at the center thereof. The second shaft 122 is loosely fitted into the through hole 131 of the code plate 130, and one side of the code plate 130 is in contact with a tip surface of the first shaft 121 as a step placed on a border of the first and the second shaft 121 and 122, respectively.

A speed nut 140 is composed of a metal disk plate, and as shown in FIG. 10, it has a base body 141 in a disk shape, and three tongues 143 formed so as to project from the center of the base body 141 by providing notches 142 on both sides thereof, and a through hole 144 in a disk shape formed in the center of the base body 141. The speed nut 140 with such structure is fitted tightly into the second shaft 122, and pressed on another surface of the code plate 130 so as to prevent the shaft 120 from falling off from the code plate 130. Specifically, the second shaft 122 is inserted into the through hole 144, and the base body 141 is pressed toward the first shaft 121, and the code plate 130 is interposed between the speed nut 140 and the first shaft 121. Each of the three tongues 143 is bent toward an opposite direction from the pressing direction (toward the left in FIG. 9) so as to be tightly fitted into the second shaft 122. By tightly fitting the tongue 143, the speed nut 140 cannot be moved in a direction of an axial line, and thus, the code plate 130 is prevented from falling off, and the speed nut 140 and the code plate 130 rotate together with the shaft 120.

Because the second shaft 122 is loosely fitted to the through hole 131 of the code plate 130, as shown in FIG. 11, the center C1 of the through hole 131 and the center C2 of the second shaft 122 are shifted in a direction orthogonal to the axial line direction, whereby positions of the second shaft 122 and the code plate 130 are determined by the speed nut 140.

Next, operation of the conventional rotary encoder R1 will be described. As the shaft 120 rotates via a steering shaft (not shown), the code plate 130 rotates therewith. The hall element 113 detects a change of magnetic pole so that a magnetic detection circuit (not shown) formed on the printed circuit board 112 detects a detection pulse corresponding to rotation of the code plate 130. When the shaft 120 rotates while the center C1 of the through hole 131 and the center C2 of the shaft 122 are shifted from each other, the code plate 130 rotates so as to represent an elliptical contour, whereby accurate pulse detection cannot be achieved. Moreover, a detected value becomes different for every rotary encoder R1, and thus, there is a concern for not being able to measure rotating angle accurately.

In the conventional rotary encoder R1 described above, the speed nut 140 is fitted into the second shaft 122 while being positioned at an end of the code plate 130, i.e., it is simply in contact with the end of the code plate 130. Therefore, there is a possibility that positions of the speed nut 140 and the code plate 130 may be shifted from each other. If such shifting occurs between the speed nut 140 and the code plate 130, the center positions C1 and C2 of the speed nut 140 and the code plate 130, respectively, are not determined, and thus, when the shaft 120 rotates, the code plate 130 rotates as it represents an elliptical contour, whereby its performance deteriorates. In order to prevent such shift, precision of the through hole 131 of the code plate 130 and the second shaft 122 may be corrected manually, but it would lead to problems such as a deteriorated mass productivity and an increased cost. Moreover, when precision of the size of both parts is enhanced, the cost would increase.

SUMMARY OF THE INVENTION

The present invention has been achieved in view of the above problems, and its object is to provide a rotary encoder whose code member moves along an accurate circle as a shaft rotates.

In order to solve the above-described problems, in one embodiment, a rotary encoder according to the present invention has a structure, including a casing; a detection element attached to the casing; and a rotatable rotor having a mounting aperture for inserting a shaft at the center thereof and being provided with a code member opposed to the detection element, in which an inner peripheral surface of the mounting aperture is provided with a spring member having a base and a plurality of tongues for energizing the shaft toward the center of the mounting aperture so as to set a position of the shaft at the center of the mounting aperture.

In a second embodiment, the spring member of a rotary encoder according to the present invention is formed from a metal plate, the base of the spring member is in a plate shape, and the tongue is formed in series to the base so as to project in a direction of a rotation axis line of the rotor, the tongue being in elastic contact with the shaft at generally mid-portion in a direction of a rotation axis line of the mounting aperture.

In a third embodiment, the tongue of a rotary encoder according to the present invention is provided with a flat portion parallel to the rotation axis line of the rotor and being in elastic contact with an outer periphery of the shaft.

In a fourth embodiment, the tongue of a rotary encoder according to the present invention is supported at both ends thereof by the base.

In a fifth embodiment, the tongue of a rotary encoder according to the present invention is supported at one end thereof with respect to the base.

In a sixth embodiment, the tongue of a rotary encoder according to the present invention has at least one pair of projections formed to be disposed in a direction of the rotation axis line of the rotor, the projections projecting toward the center of the mounting aperture and being in contact with the outer periphery of the shaft.

In a seventh embodiment, the code member of a rotary encoder according to the present invention is made of a magnet, and a basal portion of a rising portion of the tongue notched up from the base is disposed at a position out of a thickness range in a direction of the rotation axis line of the code member.

In an eighth embodiment, the base of the spring member of an rotary encoder of the present invention is formed by bending into a cylindrical shape, and is housed within the mounting aperture of the rotor.

Moreover, in a ninth embodiment, the spring member of a rotary encoder according to the present invention is formed from a square plate material.

Furthermore, in a tenth embodiment, the spring member of a rotary encoder according to the present invention has an engaging portion projecting from an end thereof by bending generally perpendicularly, the engaging portion being latched by an end of the rotor.

DETAILED DESCRIPTION OF PREFERRED EMBODIMENT

Figure 1:
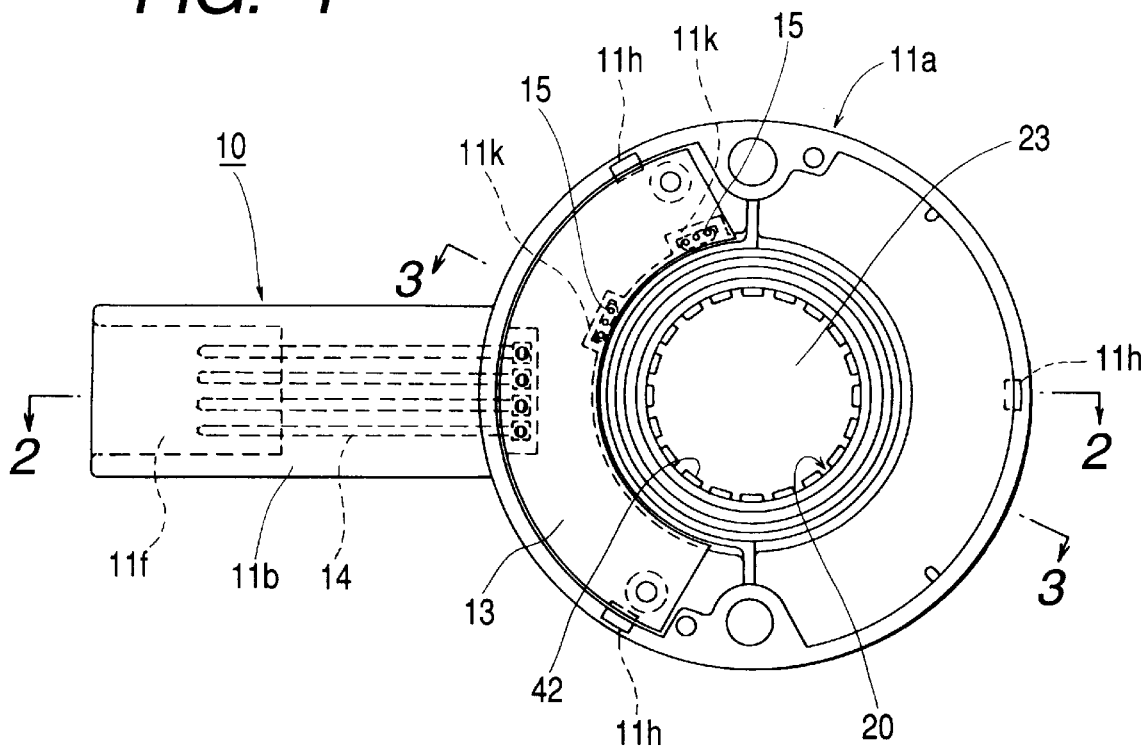
FIG. 1 is a bottom view of a rotary encoder according to Embodiment 1 of the present invention with a shaft, a bottom cover or the like being removed therefrom.
Figure 2:
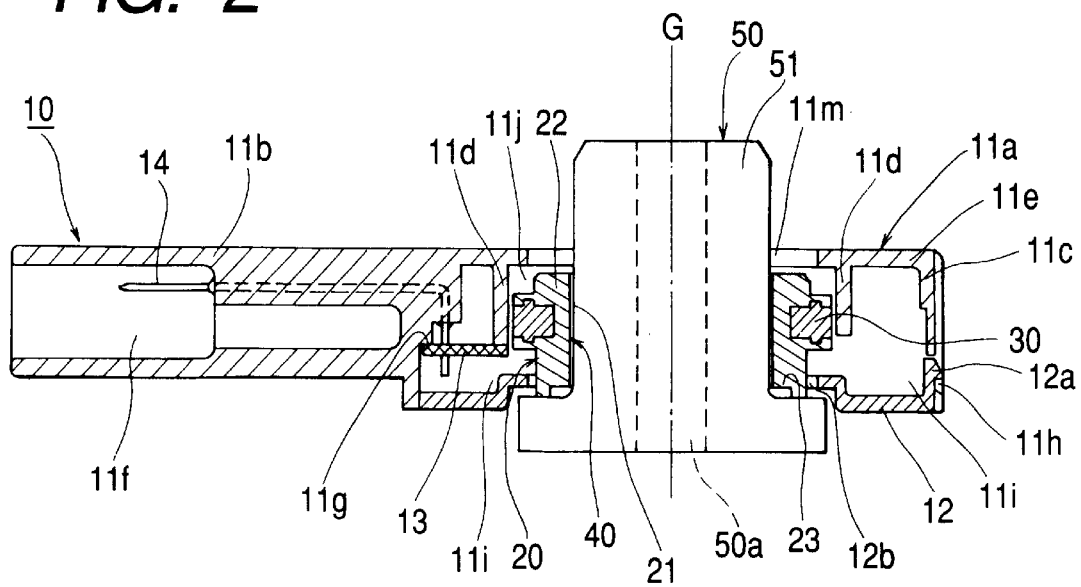
FIG. 2 is a cross-sectional view taken along 2—2 of FIG. 1.
Figure 3:
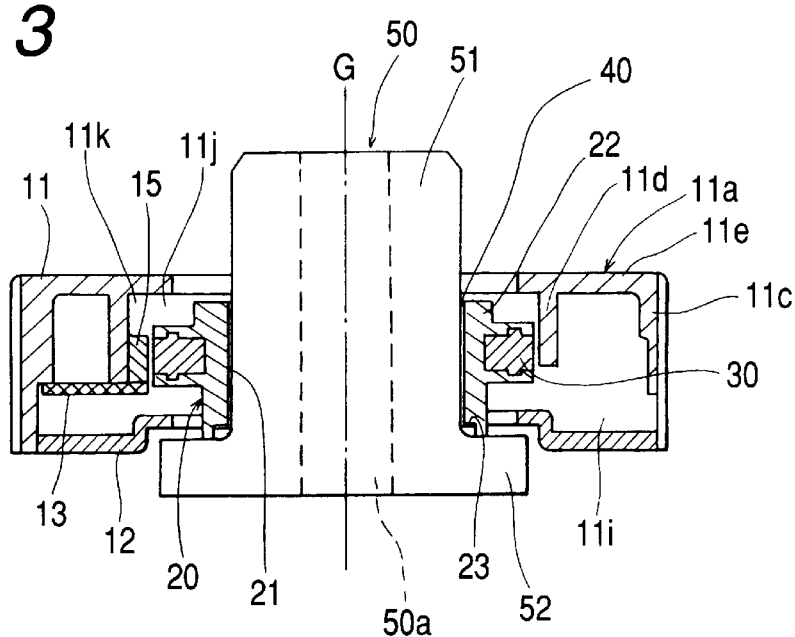
FIG. 3 is a cross-sectional view taken along 3—3 of FIG. 1.
Figure 4:
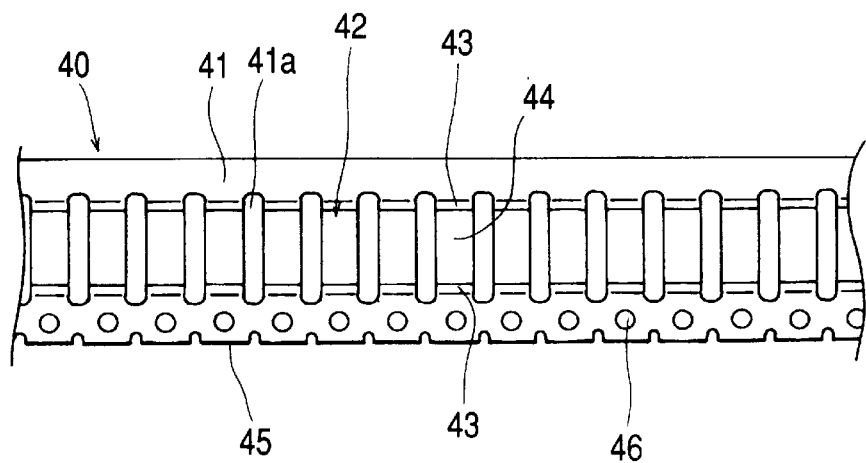
FIG. 4 is a plan view of a spring member of a rotary encoder according to Embodiment 1 of the present invention.
Figure 5:
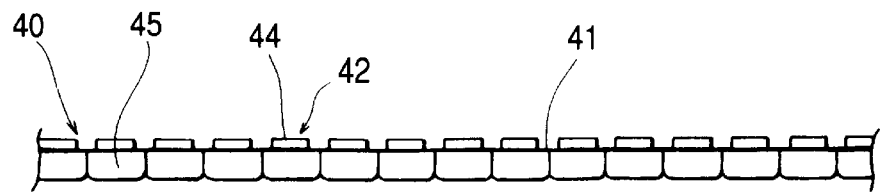
FIG. 5 is a bottom view of a spring member of a rotary encoder according to Embodiment 1 of the present invention.
Figure 6:
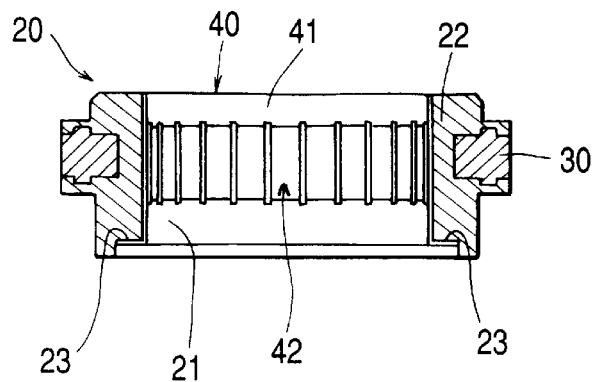
FIG. 6 is a cross-sectional view of main parts showing a spring member of an rotary encoder according to Embodiment 1 of the present invention provided for a rotor.
Figure 7:
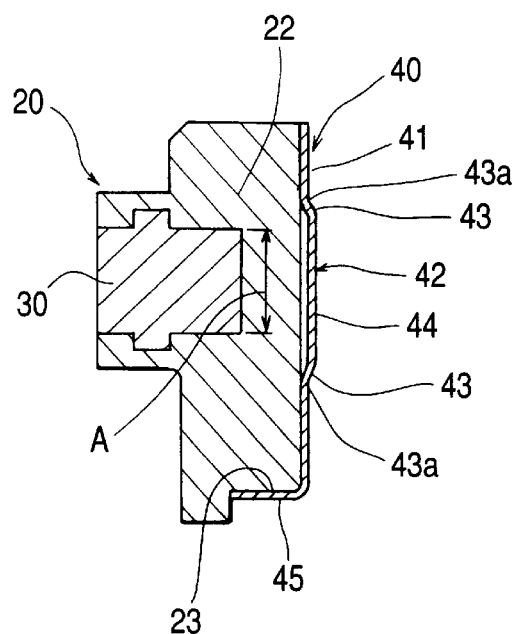
FIG. 7 is an enlarged cross-sectional view of main parts illustrating a spring member of a rotary encoder according to Embodiment 1 of the present invention.

A rotary encoder according to Embodiment 1 of the present invention will be described with reference to the drawings. FIG. 1 is a bottom view of a rotary encoder according to Embodiment 1 of the present invention with a shaft, a bottom cover and the like removed therefrom, FIG. 2 is a cross-sectional view taken along 2—2 of FIG. 1, FIG. 3 is a cross-sectional view taken along 3—3 of FIG. 1, FIG. 4 is a plan view of a spring member of a rotary encoder according to Embodiment 1 of the present invention, FIG. 5 is a bottom view of the spring member, FIG. 6 is a cross-sectional view of main parts showing a spring member of a rotary encoder according to Embodiment 1 of the present invention provided for a rotor, and FIG. 7 is an enlarged cross-sectional view of main parts illustrating a spring member of a rotary encoder according to Embodiment 1 of the present invention.

Next, a rotary encoder according to Embodiment 1 of the present invention will be described with reference to FIGS. 1 to 7, in which, a casing 10 is formed of a molded synthetic resin, and composed of a base body 11 and a bottom cover 12 of an annular flat plate snap-connected to the base body 11.

The base body 11 includes a tube-like housing 11a having an annular wall having a cross section in a horseshoe shape, and a connector 11b in a narrow rectangular shape projecting outward from a side edge of the housing 11a while connecting therewith. The housing 11a is composed of an outer wall 11c of a major diameter, an inner wall 11d of a minor diameter, and a flat-plate wall 11e connecting between the outer wall 11c and the inner wall 11d and having an aperture 11m at the center thereof. Referring now to FIG. 1, the inner wall 1ld forms a depressed portion 11k having two depressed portions toward the outer wall 11c side. To the connector 11b, a receiving portion 11f of a double-stack rectangular indentation is formed toward the housing 11a. On a border of the housing 11a and the connector 11b, a step 11g formed to expand toward the connector 11b is provided, and a nail receiving aperture 11h is provided on an edge of the outer wall 11c.

The bottom cover 12 is composed of an annular flat plate of synthetic resin, and the center portion thereof having the aperture 12b is depressed annularly, and a outer edge thereof has a mounting foot 12a having a nail formed thereon.

The bottom cover 12 is fixed by being snap-connected to the housing 11a so as to cover an opened side thereof. Specifically, from the opened side of the housing 11c, the bottom cover 12 is topped so as to fit inside the outer wall 11c, so that it is snap-connected thereinto by the nail of the mounting foot 12 engaging to the nail receiving aperture 11h.

When the bottom cover 12 is snap-connected, a toroidal hallowed portion 11i is formed between the bottom cover 12 and the inner and outer wall 11d and 11c, respectively, of the housing 11a. At the same time, an inner side of the inner wall 11d and the bottom cover 12 form a recess 11j for housing. The recess 11j is in a state where the top and the bottom thereof are opened by the apertures 11m and 12b.

The printed circuit board 13 is formed of a rigid and insulated base plate of a flat sector shape plate. The connector 11b has four terminals 14 bent by 90 degrees. One end of the terminal 14 is soldered thereto while penetrating the printed circuit board 13, while another end thereof is projecting inside the receiving portion 11f. As shown in FIGS. 1 and 3, inside the printed circuit board 13, a hall element 15 as a detecting element of an elliptic column is attached vertically to the printed circuit board 13 by an appropriate means such as soldering.

A printed circuit board 13 is placed on the inner wall 11d and the step 11g, and the four terminals 14 buried to the connector 11b are soldered thereto, so that they are fixed in the hollowed portion 11i of the housing 11a. As shown in FIGS. 1 and 3, the hall element 15 is housed within a depressed portion 11k of the inner wall 11d and exposed toward the recess 11j.

A rotor 20 includes a cylinder 22 having a circular mounting aperture 21 at the center thereof. The mounting aperture 21 provided to the cylinder 22 is penetrating in a vertical direction. On an end of the cylinder 22, an annularly depressed latching portion 23 is formed.

A code member 30 is formed of a permanent magnet such as a plastic magnet in a generally annular shape. On top and bottom surfaces of the code member 30 are provided with an annular protrusion 30a formed thereon. Such code member 30 is attached to the rotor 20 by insert forming so as to be integrated with the rotor 20. At that time, the code member 30 is latched by the protrusion 30a, and thus, even if a great centrifugal force is applied due to a high-speed rotation, the code member 30 is securely held at the rotor 20, and the code member 30 and the rotor 20 can offer more resistance to the separation.

The rotor 20 integrated with the code member 30 is housed in the depressed portion 11j of the casing 10 so as to be opposite of the inner wall 11d. At that time, the rotor 20 is positioned so that the code member 30 is placed at the same height as the hall element 15, and a part of the code member 30 is opposing to the hall element 15 housed in the recess 11k, as shown in FIG. 3.

The rotor 20 integrated with the code member 30 housed in the manner described above can freely rotate in the depressed portion 11j, and the hall element 15 reads changes of the magnetic pole of the code member 30 rotating with the rotor 20.

A spring member 40 has a base 41 which is formed by bending a metal flat plate in a cylinder shape, a plurality of long grooves 41a provided in a latitudinal direction of the base 41 so as to be placed on the base 41, and a tongue 42 formed by being elevated between the long grooves 41a, and an engaging portion 45 extending from a side edge of one side of the base 41 so as to form a flange.

The tongue 42 is supported at both sides by the base 41, and has a rising portion 43 acting as a supporting portion for the base 41, and a flat portion 44 formed on the top portion between the rising portion 43, the flat portion 44 having a relatively long span.

A manufacturing method of the spring member 40 is as follows. As shown in FIGS. 4 and 5, by sending a metal hoop material, feed holes 46 and long grooves 41a are sequentially subjected to a punching process, and thereafter, the tongue 42 is formed by compressing between the long grooves 41a by a desirable jig such as a hollow punch. Thereafter, one of the side edges is bent to the right angle to form the engaging portion 45. After cutting the hoop material to a desirable length (in a square shape) and bending the base 41 in a cylindrical shape, manufacturing of the spring member 40 as shown in FIG. 6 is completed. The spring member 40 formed in the above described manner is formed by bending a square plate material into a cylindrical shape.

The spring member 40 having the structure described above, as shown in FIG. 6, is attached over an entire inner peripheral surface of the mounting aperture 21 of the rotor 20 so as to house the base 41 by bending in a cylindrical shape. Specifically, the base 41 becomes in contact with the inner peripheral surface of the mounting aperture 21, and the engaging portion 45 of the spring member 40 is attached by being latched by the latching portion 23 of the rotor 20. Moreover, the spring member 40 itself is a blade spring, and a force that opens outward is applied to the cylindrical shape base 41, thereby it acts in such a manner that the base 41 of the spring member 40 is pressed outward while being housed within the mounting aperture 21. Thus, the spring member 40 can be held securely so as to be integrated with the rotor 20.

When the spring member 40 is attached, as shown in FIG. 7, the tongue 42 projects toward the center while being in a position parallel to a rotation axis line G. Moreover, the tongue 42 opposes the code member 30 through the cylinder 22 of the rotor 40. At that time, a basal portion 43a of the rising portion 43 is in a position out of a thickness range A of the rotation axis line G of the code member 30.

The shaft 50 is made of a metal, and in the present invention, is formed by sintered metal. The shaft 50 has a cylindrical column base 51, a guard 52 composed of a disk-like flange formed integrally with the base 51, and a through hole 50a penetrating vertically from the base body 51 to the guard 52 formed at the center thereof.

The shaft 50 has the base 51 inserted through the mounting aperture 21 of the rotor 20, and is tightly fitted with the tongue 42 by bending the tongue 42 of the spring member 40. Specifically, the shaft 50 is inserted from a side of the latching portion 23 of the rotor 20 and pressed until the guard 52 becomes in contact with an end surface of the cylinder 22 of the rotor 20, whereby the flat portion 44 of the tongue 42 is bent outwardly (in a direction of the code member 30) so that the shaft 50 is tightly fitted with the spring member 40. At that time, because the spring member 40 is housed within the mounting aperture 21 of the rotor 20, the base 41 of the spring member 40 does not move in a direction perpendicular to a rotation axis line G due to the base 51 of the shaft 50. As a result, movement of the rotor 20 in a direction perpendicular to the rotation axis line G with respect to the shaft 50 is controlled, thereby the shaft 50 is located at the center of the mounting aperture 21. The flat portion 44 of the tongue 42 has a relatively long span, so that the shaft 50 can be held over a wide area, thus allowing it to strengthen its holding power thereof. Moreover, the guard 52 is in contact with the rotor 20, and thus, inclination of the rotor 20 with respect to the rotation axis line G can be suppressed.

The shaft 50 is made of sintered metal, whereby it has a sufficient strength and can be manufactured relatively inexpensively. However, there is a tendency that a size of a shaft diameter varies individually, and thus, there are cases where a gap between the rotor 20 and the shaft becomes large or small. If the center of the shaft 50 is shifted from the center of the mounting aperture 21 as it is inserted and pressed into, a position of the tongue 42 does not change with respect to the mounting aperture 21, and the tongue 42 provided around the shaft 50 bends equally. Thus, the shaft 50 is corrected to displace to the center by the tongue 42, whereby the shaft 50 is placed at the center of the mounting aperture 21. Moreover, the tongue 42 is formed over an outer peripheral surface of the mounting aperture 21 with an equal interval therebetween, the tongue 42 is in elastic contact with an outer radius surface of the base 51 of the shaft 50 in average, and thus, the position of the center thereof is positively determined.

Referring now to FIG. 7, when the shaft 50 is tightly fitted as described above, the flat portion 44 is bent so that a part of the cylinder 22 that is in contact with the basal portion 43a of the rising portion 43 is subjected to the pressing force. However, in the present embodiment, the basal portion 43a of the rising portion 43 is disposed at a position out of the thickness range A in a direction of the rotation axis line G of the code member 30. Therefore, the code member 30 is no longer subjected to the pressing force directly acting thereupon.

Although not shown in the figures, the shaft 50 is rotatably held by a shaft, such as a worm gear, that is connected to a steering shaft and fit into the through hole 50a.

Next, referring to FIG. 2, operation of the rotary encoder according to the present invention will be described. When the worm gear rotates as the steering shaft (not shown) rotates, the shaft 50 also rotates along therewith. When the shaft 50 rotates, the rotor 20 rotates along therewith and the code member 30 rotates therewith. Two hall elements 15 detect a change of magnetic pole so as to output a two-phase sinusoidal wave, and a CPU (not shown) formed on the printed circuit board 13 outputs a detection pulse corresponding to the rotation of the code member 30 so as to output as an electric signal from the terminals 14.

Figure 8:
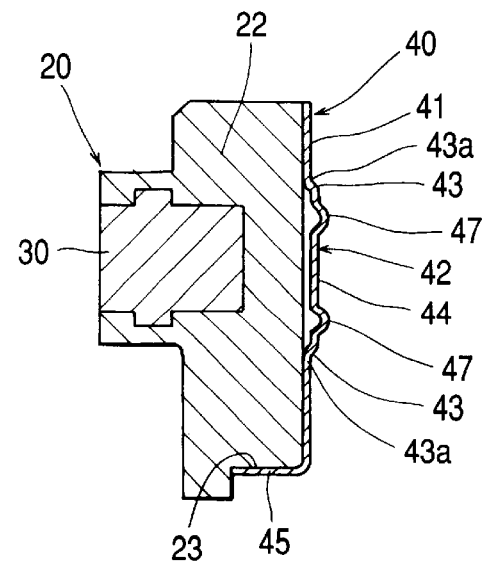
FIG. 8 is an enlarged cross-sectional view of main parts illustrating a spring member of a rotary encoder according to Embodiment 1 of the present invention.
Figure 9:
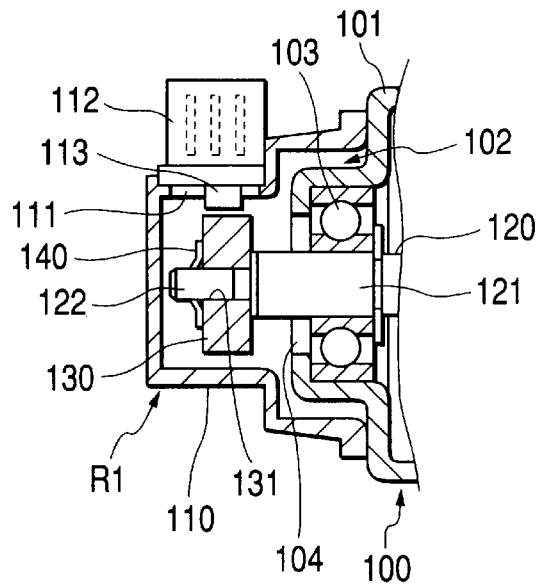
FIG. 9 is a cross-sectional view of main parts of a conventional rotary encoder.
Figure 10:
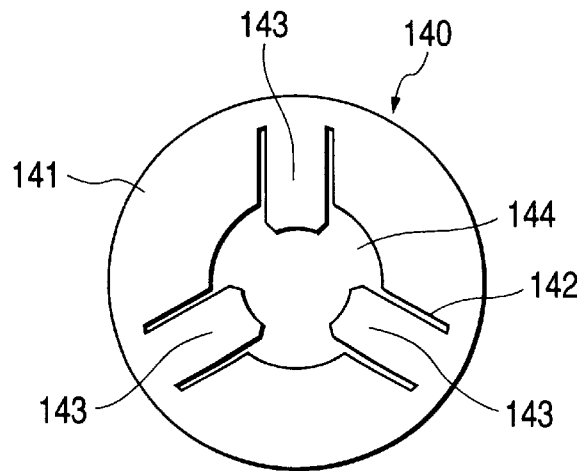
FIG. 10 is a plan view of a speed nut of a conventional rotary encoder.
Figure 11:
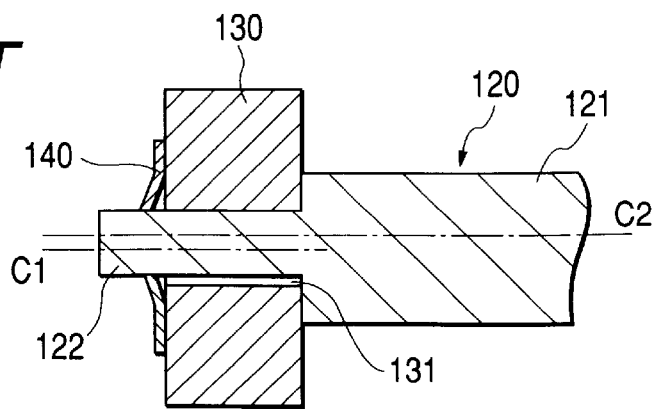
FIG. 11 is an enlarged cross-sectional view of main parts of a conventional rotary encoder.

Next, referring now to FIG. 8, a rotary encoder according to Embodiment 2 of the present invention will be described. FIG. 8 is an enlarged cross-sectional view of a rotary encoder according to Embodiment 2 of the present invention illustrating a spring member thereof. When describing the rotary encoder according to Embodiment 2, the same reference numerals and names are used for parts having the same functions as in Embodiment 1.

The rotary encoder according to Embodiment 2 of the present invention has the flat portion 44 of the tongue 42 of Embodiment 1 having a pair of projections 47 formed thereon, the pair of the projections 47 being provided by having an interval therebetween in a direction toward the center of the mounting aperture 21 of the rotor 20. The projections 47 are in contact with the outer peripheral surface of the shaft 50.

By providing the pair of the projections 47, the contact position to the shaft 50 becomes constant, whereby the shaft 50 can be held easily and securely while being parallel to the rotation axis line G. A number of the projections 47 may be greater than or equal to three so that each of them may be in contact with the outer peripheral surface of the shaft 50. Other details regarding structures and relationships are similar to Embodiment 1, and the same parts are denoted by the same reference numerals. Thus, the description therefor is omitted herein.

The tongue 42 of the rotary encoder according to Embodiments 1 and 2 of the present invention is held by both sides with respect to the base 41, whereby it can be tightly fitted thereto, and the inclination of the rotor 20 with respect to the rotation axis line G can be suppressed. Alternatively, the tongue may be held at one side with respect to the base 41.

When the tongue is held at one side, the tongue has a longer span, whereby variation of an outer shape of the shaft 50 can be dealt with even if the variation becomes great. Moreover, lifetime of the tongue can be extended.

The rotary encoder of the present invention has the above-described structure, but it is not limited thereto. For example, instead of providing the tongues 42 over the entire periphery, the tongues may be disposed so as to form polygons such as a regular triangle, a square, a hexagon or an octagon. The spring member 40 may be formed from a shape other than a rectangular shape. Moreover, the spring member 40 may have a structure having a base composed of an annular disk portion which functions as an engaging portion, in which, a tongue is formed by bending from an inner edge of the base by 90 degrees so that only the tongue is placed within a mounting aperture. In the embodiments, the tongue 42 projects in a direction of the rotation axis line G, so that the shaft 50 can be easily inserted therethrough. Alternatively, the tongue 42 may be projected in a direction of the mounting aperture 21 of the rotor 20. The code member 30 does not necessarily have to have a disk shape.

The rotary encoder according to the present invention has a structure having a spring member provided therefor, the spring member including, on an inner peripheral surface of a mounting aperture, a base and a plurality of tongues that determines a position of a shaft to the center by energizing the shaft toward the center of the mounting aperture. With such a structure, even if there is a difference in size of the shaft and the rotor (code member), the spring member does not move so as to determine the position of the shaft at the center by the tongue, whereby the center of the shaft is positioned at the center of the mounting aperture. Therefore, the code member rotates in such a manner that any point thereof draws an accurate circle without shifting from the center thereof as the shaft rotates, thereby enabling to provide a high performance rotary encoder providing a desirable output.

A spring member of the rotary encoder according to the present invention is formed from a metal plate, and a base of the spring member shows a flat-plate state. A tongue is formed in series with the base so as to project in a rotation axial direction of the rotor. At generally in the middle portion of the rotation axial direction of the mounting aperture, the tongue is in elastic contact with the shaft, and thus, the tongue may be formed by a simple method such as stamping, thus enabling to provide a rotary encoder that is inexpensive and has a desirable mass productivity. By providing the tongue at generally mid portion of the mounting aperture, it can be held in elastic contact with the shaft in a stable manner.

A tongue of the rotary encoder according to the present invention has a flat portion that is in elastic contact with the outer peripheral surface of the shaft and is parallel to the rotation axial direction of the rotor, thereby the shaft is in elastic contact with the flat surface. As a result, it is possible to maintain the shaft parallel to the rotation axial line, thus enabling to provide a high-performance rotary encoder.

A tongue of the rotary encoder according to the present invention is formed so as to be supported at both ends thereof with respect to the base. Therefore, it is possible to strengthen a fitting force, thus enabling to hold the shaft securely.

A tongue of the rotary encoder according to the present invention is formed so as to be supported at one end with respect to the base. Therefore, a span of the tongue may be longer, whereby, even if the size difference becomes large relative to the mounting aperture, the tongue can be tightly fitted into the shaft. As a result, it is possible to determine a position of the shaft at the center of the mounting aperture, thus allowing for a lasting tongue.

According to the present invention, a tongue of the rotary encoder has at least one pair of projections in a direction of the rotation axial line of the rotor, the projections projecting toward the center of the mounting aperture and being in contact with the outer peripheral surface of the shaft. The pair of projections can serve to hold the shaft parallel to the rotation axial line. As a result, it is possible to easily and securely maintain the shaft parallel to the rotation axial line, thus providing a high-performance rotary encoder.

A code member of the rotary encoder according to the present invention is formed using a magnet and has a structure in which, a basal portion of a rising portion of the tongue notched up from the base is disposed out of a thickness range of the rotation axial direction of the code member. As a result, unnecessary force does not act on the code member, thus enabling to prevent the code member from being damaged or shifting.

A base of the spring member of the rotary encoder of the present invention is formed by bending into a cylindrical shape, and is housed within a mounting aperture of the rotor. As a result, the spring member and the rotor overlap with each other, thus enabling to downsize in the axial direction.

A spring member of the rotary encoder of the present invention is formed from a square plate, whereby the spring member can be made easily, thus providing a rotary encoder that in inexpensive and has a desirable mass productivity.

A spring member of the rotary encoder of the present invention has an engaging portion that projects from an edge by bending generally perpendicularly, the engaging portion latched at the end of the engaging portion. Thus, falling off of the spring member can be prevented by latching.

Moreover, because the spring member does not move by the engaging portion when the shaft is inserted, the shaft can be securely held.

What is claimed is:

1. A rotary encoder, comprising:

a casing;

a detection element attached to the casing; and a rotatable rotor having a mounting aperture for inserting a shaft at the center thereof and being provided with a code member opposing to the detection element, wherein an inner peripheral surface of the mounting aperture is provided with a spring member having a base and a plurality of tongues for energizing the shaft toward the center of the mounting aperture so as to set a position of the shaft at the center of the mounting aperture, and wherein the spring member is formed of a long hoop-shaped metal plate, the plurality of tongues are in series with the base of the spring member so as to project from the base, and the spring member has a cylindrical shape due to a cutting operation on a hoop material to a length corresponding to a length in a direction of the diameter of the shaft and the cylindrical spring member is disposed so as to be wound around the shaft.

2. A rotary encoder according to claim 1, wherein, the code member is made of a magnet, and wherein a basal portion of a rising portion of the tongue notched up from the base is disposed at a position out of a thickness range in a direction of the rotation axis line of the code member.

3. A rotary encoder according to claim 1, wherein the spring member has an engaging portion projecting from an end thereof by bending generally perpendicularly, the engaging portion being latched by an end of the rotor.

* * * * *